US006982756B2

United States Patent
Nakamura

(10) Patent No.: US 6,982,756 B2
(45) Date of Patent: Jan. 3, 2006

(54) DIGITAL CAMERA, IMAGE SIGNAL PROCESSING METHOD AND RECORDING MEDIUM FOR THE SAME

(75) Inventor: Kenji Nakamura, Takatsuki (JP)

(73) Assignee: Minolta Co. Ltd., Osaka (JP)

( * ) Notice: Subject to any disclaimer, the term of this patent is extended or adjusted under 35 U.S.C. 154(b) by 704 days.

(21) Appl. No.: 09/817,525

(22) Filed: Mar. 26, 2001

(65) Prior Publication Data

US 2002/0008760 A1    Jan. 24, 2002

(30) Foreign Application Priority Data

Mar. 28, 2000 (JP) .............................. 2000-089093

(51) Int. Cl.
    *H04N 5/208* (2006.01)
    *H04N 5/217* (2006.01)
    *G06K 9/40* (2006.01)
(52) U.S. Cl. ..................... 348/241; 348/252; 382/274
(58) Field of Classification Search ............ 348/222.1, 348/223.1, 251, 252, 254, 541, 253, 615; 382/274
See application file for complete search history.

(56) References Cited

U.S. PATENT DOCUMENTS 5,047,861 A * 9/1991 Houchin et al. ............ 348/247
5,867,211 A * 2/1999 Weideman et al. ......... 348/187

FOREIGN PATENT DOCUMENTS

JP    09-247499 A    9/1997
JP    11-275452 A    10/1999

* cited by examiner

*Primary Examiner*—Thai Tran
*Assistant Examiner*—Kelly Jerabek
(74) *Attorney, Agent, or Firm*—Sidley Austin Brown & Wood LLP

(57) ABSTRACT

An image captured with a CCD is divided into blocks. Light amount correction data each set for each one of the blocks are read out from a correction value table 211g, a correction value generator 211h weights the light amount correction data in accordance with the positions of target pixels to thereby generate correction values for the respective target pixels, and image field edge brightness reduction correction is performed on the respective pixels based on the correction values. Since one piece of the data is set for each block, the volume of the data is small. This also prevents boundaries between the blocks from becoming noticeable.

15 Claims, 11 Drawing Sheets

DIGITAL CAMERA, IMAGE SIGNAL PROCESSING METHOD AND RECORDING MEDIUM FOR THE SAME

This application is based on application No. 2000-89093 filed in Japan, the content of which is hereby incorporated by reference.

BACKGROUND OF THE INVENTION

1. Field of the Invention

The present invention relates to a digital camera which has a function of shading correction and/or edge enhancement, and an image signal processing method and a recording medium for the same.

2. Description of the Prior Art

In general, when an image is taken using a lens of a camera, a so-called image field edge brightness reduction phenomenon is created which is a (shading) phenomenon that the light amount decreases with a distance from a central point of the image to an edge of the image. In general, the smaller the f-number (=focal length/effective aperture) is, the larger the influence of the image field edge brightness reduction phenomenon is.

In general, in the case of a silver halide film, since a change in output characteristic exhibits a curved profile as the amount of incident light changes, despite a certain degree of the image field edge brightness reduction phenomenon, it is not noticeable in many cases. However, in the case of imaging equipment, such as a digital camera, which uses a CCD (Charge Coupled Device) which comprises a plurality of, e.g., 1.5 to 3 million pixels arranged in the form of array as an image pickup element, an output characteristic of the CCD changes stepwise pixel by pixel in accordance with a change in the amount of incident light, and therefore, a brightness difference of an image is noticeable in many cases because of the image field edge brightness reduction phenomenon. Noting this, imaging equipment which uses a CCD performs correction of an image field edge brightness reduction for correcting a difference between the brightness in a portion in the vicinity of a central point and the brightness in a peripheral portion, namely, shading correction, on each pixel of an image which was taken. A digital camera, in particular, executes shading correction by means of digital image processing, regardless whether a still image is taken or a movie image is taken.

For example, where a peripheral area in which a light amount decreases and a drop rate in the peripheral area are known in advance, multiplication of an inverse number of the drop rate at this position realizes shading correction. After reading image data of an image by a CCD and storing the image data in a predetermined image memory, a correction value is generated using a two-dimensional coordinate and a function, and a peripheral area with the decreased light amount is shading-corrected. In this case, correction values are stored in other memory as a correction table, and multiplication of the image data is executed using each correction value as a coefficient, to thereby correct the decreased light amount in the peripheral area.

In general, as a correction value for shading correction or the like, data which correspond on one-to-one basis to data regarding the respective pixels are necessary for the purpose of accurate correction.

For instance, image data expressed by 2048 pixels in the horizontal direction and 1536 pixels in the vertical direction result in approximately 3.15 million pixels. In order to assign correction values individually to all pixels of such a large quantity of image data corresponding to as many as 3.15 million pixels, when a correction value of eight bits is to be used for each pixel, for example, it is necessary to prepare a correction table whose size is about three MB as the correction values. Further, since a pixel number of a CCD is expected to increase to 4 to 5 million in the near future, a data size of a correction table is expected to swell up even further to as large as 4 to 5 MB.

In addition, when parameters of optical conditions such as zooming and a stop change, more than one data tables are necessary for each one of those parameters, which in turn increases the total volume of data by several folds.

Noting this, to decrease the size of a data table of correction values, one piece of correction data may be set for each block of 4×4 pixels, for instance, to correct block by block. In this case, the size of a data table of correction values is 1/16 of that when correction values are prepared each for each one of pixels.

However, in this case, since correction values sharply change at contours of blocks, depending on the degree of data correction, a step on blocks becomes noticeable in a peripheral area of an image on a screen, which may deteriorate the quality of the image. Hence, in order to maintain an image quality at a constant level, the conventional approaches have no other alternative but to suppress the degree of shading correction, correction of edge resolution reductions or the like to a certain limit.

Further, while the conventional approaches realize shading correction by means of digital image processing as described above, among characteristics of a general lens is an image field edge resolution reduction phenomenon that a resolution in a peripheral area of an image becomes lower than a resolution in a central area of the image, and the phenomenon varies a distribution of an MTF (Modulation Transfer Function). As the image field edge resolution reduction phenomenon has not been so far addressed by any digital image processing, the image shows increasingly blurred with a distance toward the peripheral area of the image from the central area of the image, and therefore, the quality of the image is poor.

SUMMARY OF THE INVENTION

Accordingly, an object of the present invention is to provide a digital camera, and an image signal processing method and a recording medium for the same, with which it is possible, during shading correction, to reduce a load in digital image processing which is associated with a reduced amount of correction values, while preventing a deterioration in the quality of an image.

Another object of the present invention is to provide a digital camera, and an image signal processing method and a recording medium for the same, with which it is possible to easily correct a reduction in resolution in a peripheral area.

To solve the problems described above, one aspect of the present invention is to provide a digital camera comprising: an image pickup element for capturing an image; a correction value memory for storing predetermined light amount correction data each set in advance for each one of predetermined blocks which are obtained by dividing the entire area of the image captured by the image pickup element into at least a central area and a peripheral area; a correction value generator for generating correction values regarding light amounts at the respective target pixels within the blocks based on the plurality pieces of light amount correction data which are held in the correction value memory; and an edge brightness reduction corrector for correcting image field edge brightness reductions at the respective pixels based on the correction values regarding light amounts generated by the correction value generator.

Another aspect of the present invention is to provide a digital camera comprising: an image pickup element for capturing an image; a correction value memory for storing predetermined resolution correction data each set in advance for each one of predetermined blocks which are obtained by dividing the entire area of the image captured by the image pickup element into at least a central area and a peripheral area; and an edge enhancer for edge-emphasizing the respective pixels based on the resolution correction data which are held in the correction value memory to thereby correct image field edge resolution reductions.

Further aspect of the present invention is to provide an image signal processing method for a digital camera, comprising: generating, at which in a condition that a predetermined correction value memory holds predetermined light amount correction data each set in advance for each one of predetermined blocks which are obtained by dividing the entire area of the image captured by an image pickup element into at least a central area and a peripheral area, correction values regarding light amounts at the respective target pixels within the blocks based on the light amount correction data; and correcting image field edge resolution reductions at the respective pixels based on the generated correction values regarding the light amounts.

Still further aspect of the present invention is to provide an image signal processing method for a digital camera, comprising: in a condition that a predetermined correction value memory holds predetermined resolution correction data each set in advance for each one of predetermined blocks which are obtained by dividing the entire area of the image captured by the image pickup element into at least a central area and a peripheral area, executing edge-enhancement for the respective pixels based on the resolution correction data, to thereby correct image field edge resolution reductions.

Still further aspect of the present invention is to provide a recording medium which stores a program for correcting light amount drops at the periphery of an image which is captured using a predetermined image pickup element of a digital camera, wherein the program is for executing a sequence in which, in a condition that, within the digital camera, predetermined light amount correction data each set in advance for each one of predetermined blocks which are obtained by dividing the entire area of the image captured by the image pickup element into at least a central area and a peripheral area are held, generating correction values regarding light amounts at the respective target pixels within the blocks based on the light amount correction data, and for executing a sequence for correcting image field edge brightness reductions at the respective pixels based on the generated correction values regarding the light amounts.

Still further aspect of the present invention is to provide a recording medium which stores a program for correcting resolutions at the periphery of an image which is captured using a predetermined image pickup element of a digital camera, wherein the program is for executing a sequence in which, in a condition that predetermined resolution correction data each set in advance for each one of predetermined blocks which are obtained by dividing the entire area of the image captured by the image pickup element into at least a central area and a peripheral area are held in the digital camera, the respective pixels are edge-enhanced based on the held resolution correction data, to thereby correct image field edge resolution reductions.

These and other objects, advantages and features of the invention will become apparent from the following description thereof taken in conjunction with the accompanying drawings, which illustrate specific embodiments of the invention. In the following description, like parts are designated by like reference numbers throughout the several drawings.

DETAILED DESCRIPTION OF THE PREFERRED EMBODIMENTS

<Basic Structure of Digital Camera>

Figure 1:
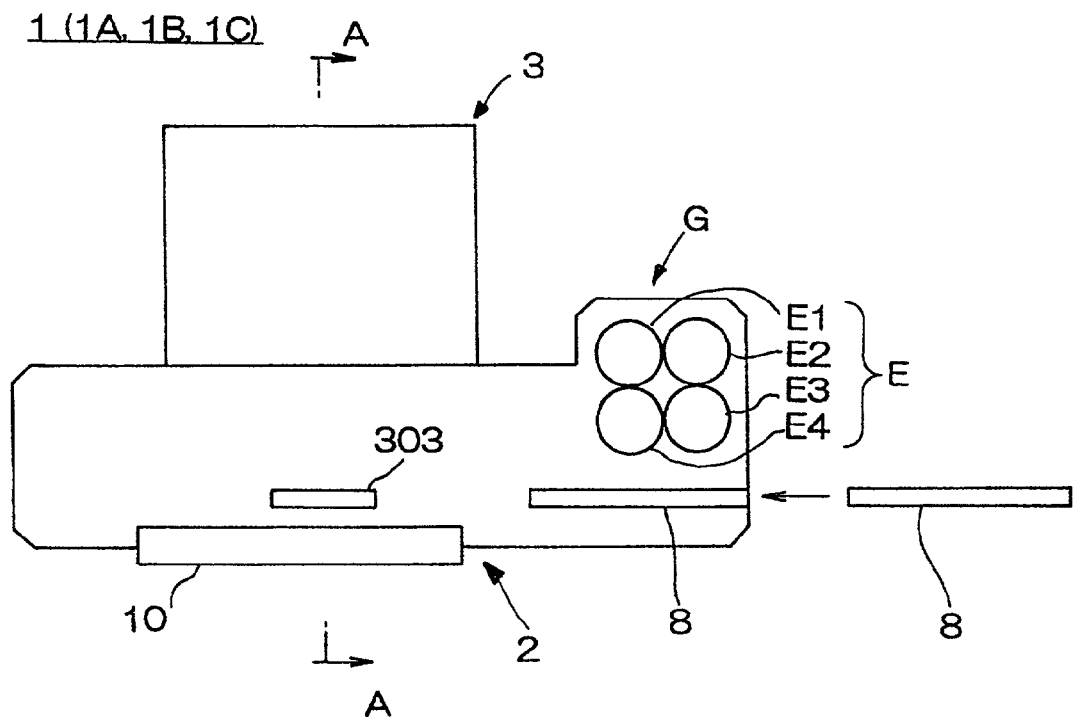
FIG. 1 is a plan view of a digital camera according to a first preferred embodiment of the present invention.
Figure 2:
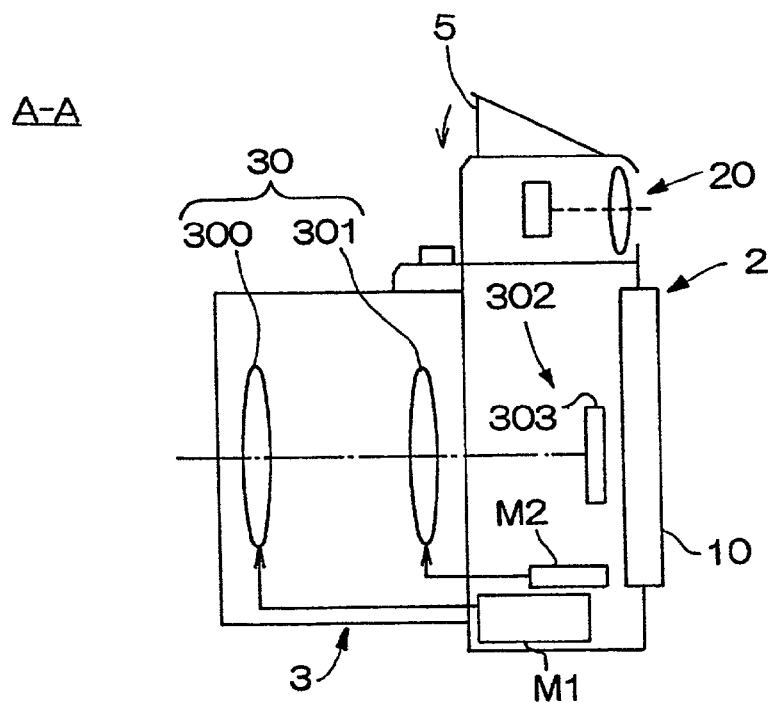
FIG. 2 is a cross sectional view of the digital camera.
Figure 3:
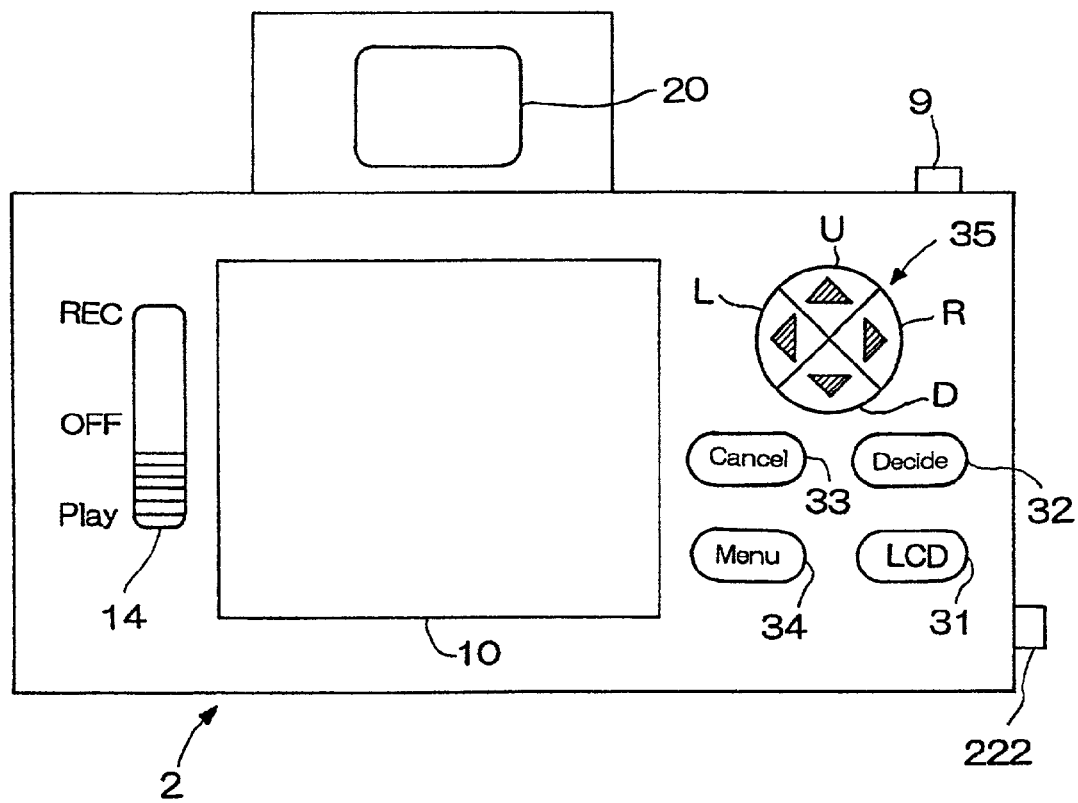
FIG. 3 is a front view of the digital camera.

FIGS. 1 through 3 are drawings showing a basic structure of a digital camera 1, of which FIG. 1 is a plan view, FIG. 2 is a cross sectional view as viewed from the A—A position in FIG. 1, and FIG. 3 is a back view. These drawings are not necessarily in accordance with the third angle projection, but conceptually show an example of the basic structure of the digital camera 1.

As shown in these drawings, the digital camera 1 has an approximately rectangular shape, and as shown in FIG. 2, comprises an image pickup circuit 302 which has a CCD color sensor 303 at an appropriate position behind lens units 30 which form a taking lens. Further, the lens units 30 comprise a variator lens 300 and a compensator lens 301.

On the other hand, disposed inside a camera main unit 2 are a zoom motor M1 for changing a zoom rate of the variator lens 300 and a motor M2 for focusing by driving the compensator lens 301.

A grip portion G is formed as shown in FIG. 1 in a front surface of the camera main unit 2, and a built-in flash 5 of a pop-up type is disposed to a top end portion of the camera main unit 2 at a proper position. Further, as shown in FIG.

3, a top surface of the camera main unit 2 seats a shutter start button 9. The shutter start button 9 has a function of detecting and judging a half-pressing state which is used as a trigger for adjustment of a focus and a full-pressing state which is used as a trigger to take an image for recording.

On the other hand, as shown in FIG. 3, a back surface of the camera main unit 2 seats a liquid crystal display (LCD) 10 for showing live view of a taken image and for reproducing a recorded image and the like, and an electronic view finder (EVF) 20. Unlike an optical finder, the LCD 10 and the EVF 20 which use an image signal received from the CCD 303 for displaying serve as a finder.

In the back surface of the camera main unit 2, a record/play setting switch 14 is formed with which a "record mode" and a "play mode" are switched. The record mode is a mode for photographing, while the play mode is a mode for reproducing and displaying, on the LCD 10, a photographed image which is recorded in a memory card 8.

A four way switch 35 is disposed to a right-hand side portion of a back surface of the digital camera 1. With an L-button and an R-button pressed, the zoom motor M1 is driven to thereby zoom up or down. Using a U-button, a D-button, the L-button and the R-button, various types of operations are performed.

Further, the back surface of the camera main unit 2 seats an LCD button 31, a Decide button 32, a Cancel button 33, and a Menu button 34.

In addition, an external monitor terminal 222 is disposed to aside surface of the camera main unit 2. The external monitor terminal 222 is a terminal for transmitting image data and the like from the digital camera 1 to an external monitor such as CRT.

As shown in FIG. 1, the digital camera 1 can accept the memory card 8. Used as a drive source for the digital camera 1 is a power source battery E in which four AA batteries E1 to E4 are connected in series.

<Basic Function of Digital Camera 1>

Figure 4:
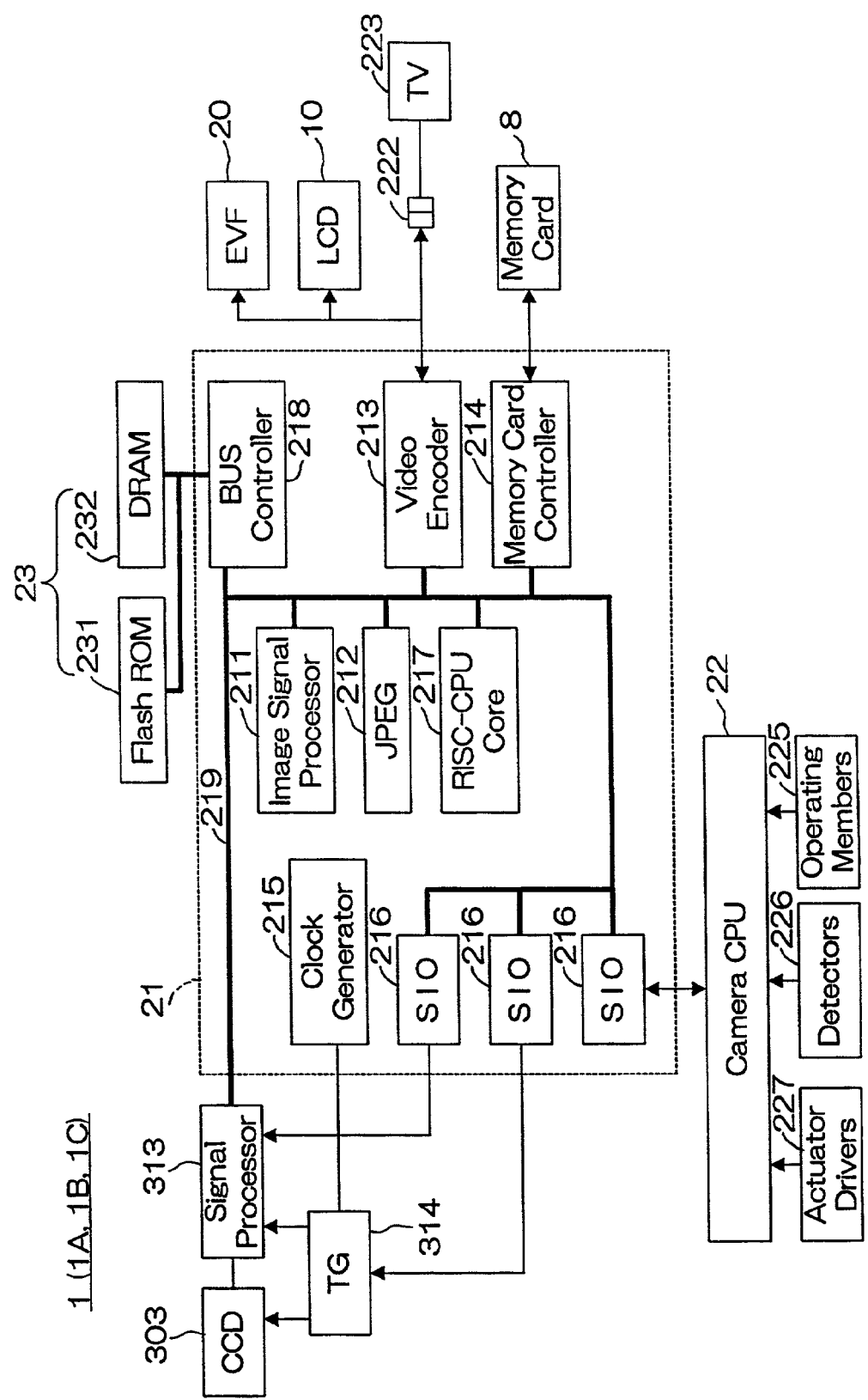
FIG. 4 is a block diagram of the digital camera.

FIG. 4 is a block diagram of a basic function of the digital camera 1.

The CCD 303 photoelectrically converts an optical image of a subject focused by the lens units 30 into image signals containing color components of R (red), G (green) and B (blue) (i.e., signals including a signal sequence of pixel signals received at the respective pixels). The CCD 303 has approximately 3.15 million pixels, 2048 pixels horizontally and 1536 pixels vertically in the interline method. All the pixels are read out in two times, 768 lines each.

A signal processor 313 transfers digital image data to a CPU for the digital camera (hereinafter referred to as the "main CPU"), by means of CDS (correlative double sampling) and an A/D converter for receiving an output from the CCD 303 and converting the output into digital image data.

A timing generator (TG) 314 is for generating various types of timing pulses which are used to control driving of the CCD 303, and has a function of switching the types of image signals which are outputted by the CCD 303. The TG 314 and the CCD 303 as they operate together realize imaging.

The main CPU 21 has functions needed for the digital camera in one chip. The main CPU 21 comprises a signal processor 211, a JPEG compressor/decompressor 212, and a video encoder 213. The main CPU 21 further has a memory card controller 214, a clock generator 215, SIOs (Serial Interface) 216, a RISC-CPU core 217 for controlling the respective portions, and a bus controller 218.

The image signal processor 211 executes black correction, white balancing (WB), pixel interpolation (CCD interpolation), gamma correction, color spatial conversion for converting into YCrCb data, and additionally, image field edge brightness reduction correction, edge enhancement, etc. A function of the image signal processor 211 will be described later.

The JPEG compressor/decompressor (comp./decomp.) 212 has a function of JPEG-compressing image data processed by the image signal processor 211 and JPEG-expanding image data which are read from the memory card 8.

The video encoder 213 processes image data generated at the image signal processor 211, converts the data into a digital composite signal which is compatible with a broadcasting scheme such as NTSC and PAL, and thereafter converts into an analog composite signal using a D/A converter.

The memory card controller 214 supplies image data or the like to the memory card 8 and retrieves image data or the like from the memory card 8.

A clock generator 215 sends out a clock for the TG 314.

The SIOs 216 transmit and receive control data to and from the signal processor 313, the TG 314 and a camera CPU 22.

The bus controller 218 is for controlling data which are supplied to and outputted from an external memory 23 through a bus 219, serving also as a DMA (DirectMemoryAccess) controller.

The external memory 23 is formed by a flash ROM 231 which stores program data and a volatile DRAM (image memory) 232 which accumulates image data and the like. It is possible to store, in the flash ROM 231, program data recorded in the memory card 8 which is a recording medium, via the memory card controller 214. This allows to reflect the stored program in operations of the digital camera 1. A control program which will be described later can also be installed in the digital camera 1 from the memory card 8.

The camera CPU 22 controls the operations of the digital camera 1. That is, connected with an operating member 225 such as the shutter start button 9 which is manipulated by a user, detectors 226 which respectively show detected positions of mechanical mechanisms such as the lens units 30, and actuator drivers 227 which drive actuators such as the zoom motor M1, the camera CPU 22 executes a camera sequence.

<Data Transmission in Main CPU 21>

Next, transmission of data within the main CPU 21 will be described. The following functions of the main CPU 21 are executed in accordance with sequences which are described in a software program which is stored in the flash ROM 231 which is a rewritable recording medium.

In the main CPU 21, using the functions of the bus controller 218 as a DMA controller, data can be transmitted directly between the DRAM 232 and the respective modules in which DMA channels are set. The DMA channels are set as described below (See FIG. 5).

(1) DMA1 channel: Image signal processor→DRAM,
(2) DMA2 channel: DRAM→Image signal processor,
(3) DMA3 channel: Image signal processor→DRAM,
(4) DMA4 channel: DRAM→JPEG comp. /decomp.,
(5) DMA5 channel: JPEG comp./decomp.→DRAM,
(6) DMA6 channel: DRAM→Video encoder,
(7) DMA7 channel: DRAM→Memory card controller,
(8) DMA8 channel: Memory card controller→DRAM.

During controlling of DMA-based data transmission, first, a permission bit of a DMA setting register of the main CPU 21 is enabled. As data to be transmitted from the respective modules are generated and a DMA transmission request is issued to the bus controller 218, the bus controller 218 judges the priority of the DMA and the DMA is started up. With the DMA started up, the data can be transmitted directly between the respective modules and the DRAM 232. Further, the bus controller 218 conciliates a bus 219 for every predetermined bytes, whereby conciliation vis-a-vis other DMA request is made.

During the conciliation, if entry of data via the CCD 303 and outputting to the video encoder 213 are set with the highest DMA priority, for example, despite other DMA request, data transmission in these two channels precedes the other DMA request. Other DMA channels have the same priority levels, and when conciliation is necessary, a module executed by round-robin scheduling is given the lowest priority level so that the respective modules will be executed one after another.

<Outline of Processing in Main CPU 21>

Now, an outline of processing in such a digital camera 1 will be described.

First, with respect to image processing for so-called live view in which still images are forwarded frame by frame to thereby display a pseudo movie image, in FIG. 4, the main CPU 21 controls the TG 314 through the SIOs 216 so that the TG 314 is set to generate a clock frequency which is proper for a predetermined frame rate. At this stage, the main CPU 21 enables the DMA3 channel for an output from the image signal processor 211 and the DMA6 channel for an output from the video encoder. Image data are thereafter fed sequentially from the CCD 303 to the image signal processor 211.

Figure 5:
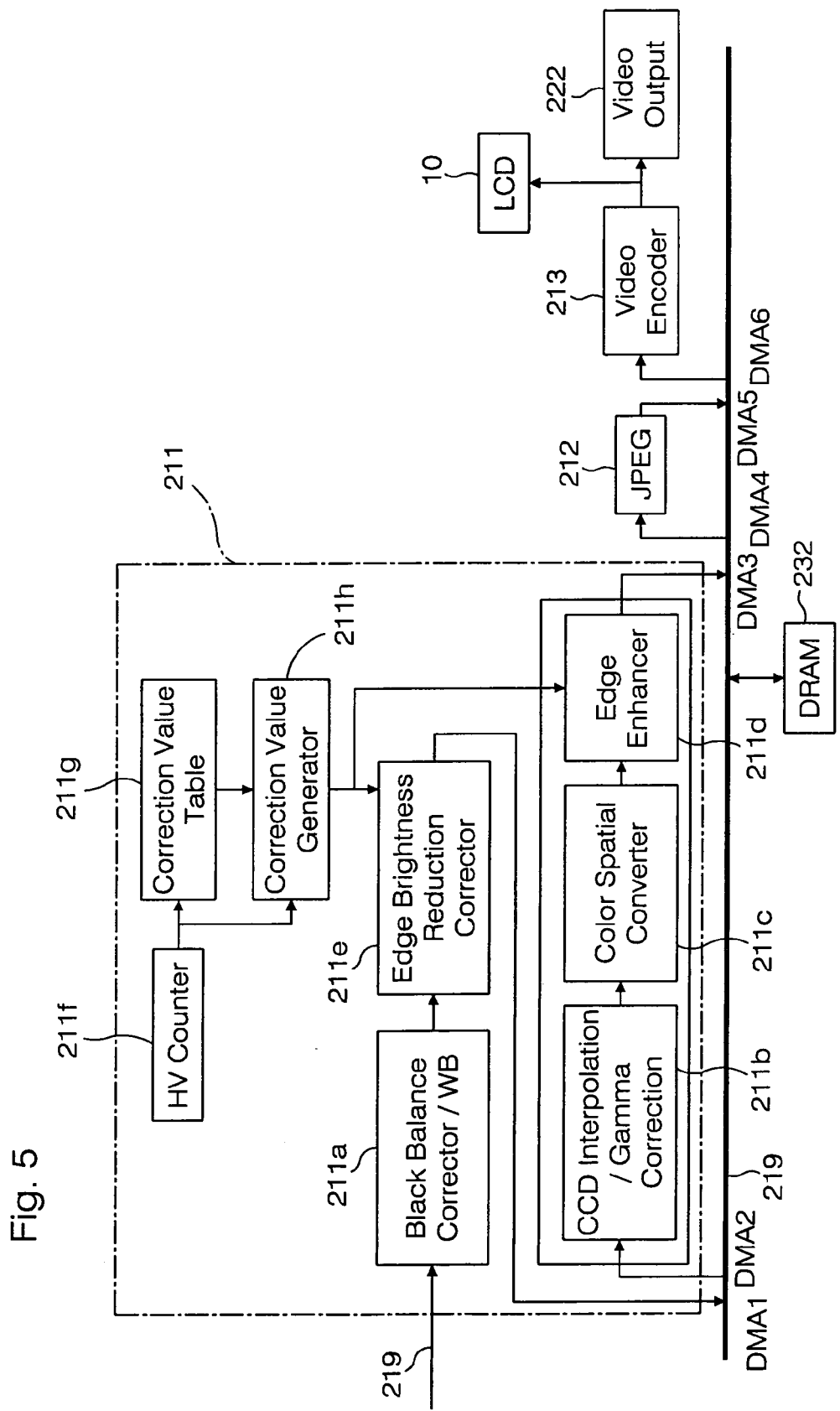
FIG. 5 is a block diagram showing a bus, an image signal processor, etc.

In the image signal processor 211, as shown in FIG. 5, black correction and white balancing are executed on the image data in a processing part 211a which is for such processing, and the image data are supplied to an image field edge brightness reduction corrector 211e. Processing is stopped in the corrector 211e during operations for live view. Hence, the data fed from the processing part 211a are outputted as they are from the next processing part 211b. The processing part 211b interpolates CCD Bayer data into RGB data, and after processed with gamma correction, the data are outputted to a color spatial converter 211c to be converted into YCrCb. Following this, an edge enhancer 211d edge-enhances a Y-signal, and the result of this is written in the DRAM 232 using the DMA3 channel. The image data written in the DRAM 232 are transferred to the video encoder 213 using the DMA6 channel and the video encoder 213 thereafter generates and outputs a composite video signal, whereby the LCD 10, the EVF 20 or the like display an image.

Next, an outline of image capturing will be described. In FIG. 4, instructed by the camera CPU 22 to capture an image which is to be recorded, the main CPU 21 sets the respective modules for capturing of the image which is to be recorded. In short, as shown in FIG. 5, the image signal processor 211 enables the DMA1 channel through the DMA5 channel, sets and controls the TG 314 through the SIOs 216 so that the TG 314 is set to generate a clock frequency for capturing of the image which is to be recorded and so that an electronic shutter speed of the CCD 303 is as instructed by the camera CPU 22.

Figure 6:
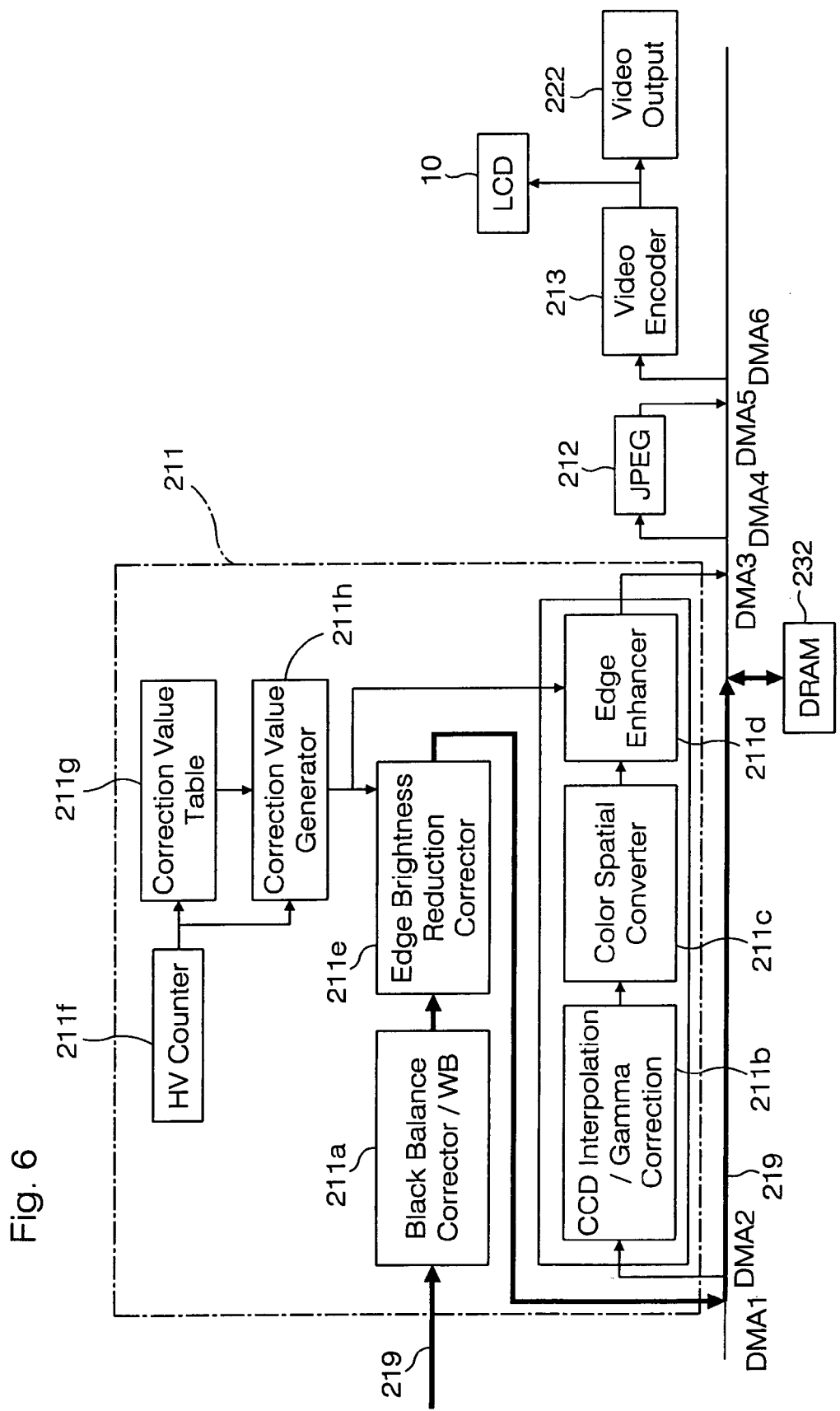
FIG. 6 is a block diagram showing a bus, an image signal processor, etc.

In consequence, image data accumulated on the CCD 303, travelling a path as that denoted at the thick line in FIG. 6, are treated with various types of image signal processing. That is, as the image data accumulated on the CCD 303 are supplied to the image signal processor 211 through the bus 219, first, at a step S01 in FIG. 8, black correction and white balancing (WB) are executed in the processing part 211a which is disposed for such processing. Following this, at a step S02 in FIG. 8, the image field edge brightness reduction corrector 211e executes shading correction. The shading-corrected image data are written as two fields in the DRAM 232 through the DMA1 (step S03 in FIG. 8).

At this stage, the corrector 211e, as shown in FIG. 6, reads table data of the light amount correction data which are stored in a correction value table 211g based on a value which is set by an HV counter 211f which expresses the location of a target pixel, and a correction value generator 211h generates a correction value based on the value which is set by the HV counter 211f and the light amount correction data of the table data within the correction value table 211g. The image field edge brightness reduction corrector 211e multiplies the respective pieces of the pixel data by the correction values generated by the correction value generator 211h and consequently performs shading correction, and writes the data in the DRAM 232 through the bus 219. The shading correction at the corrector 211e will be described in detail later.

Figure 7:
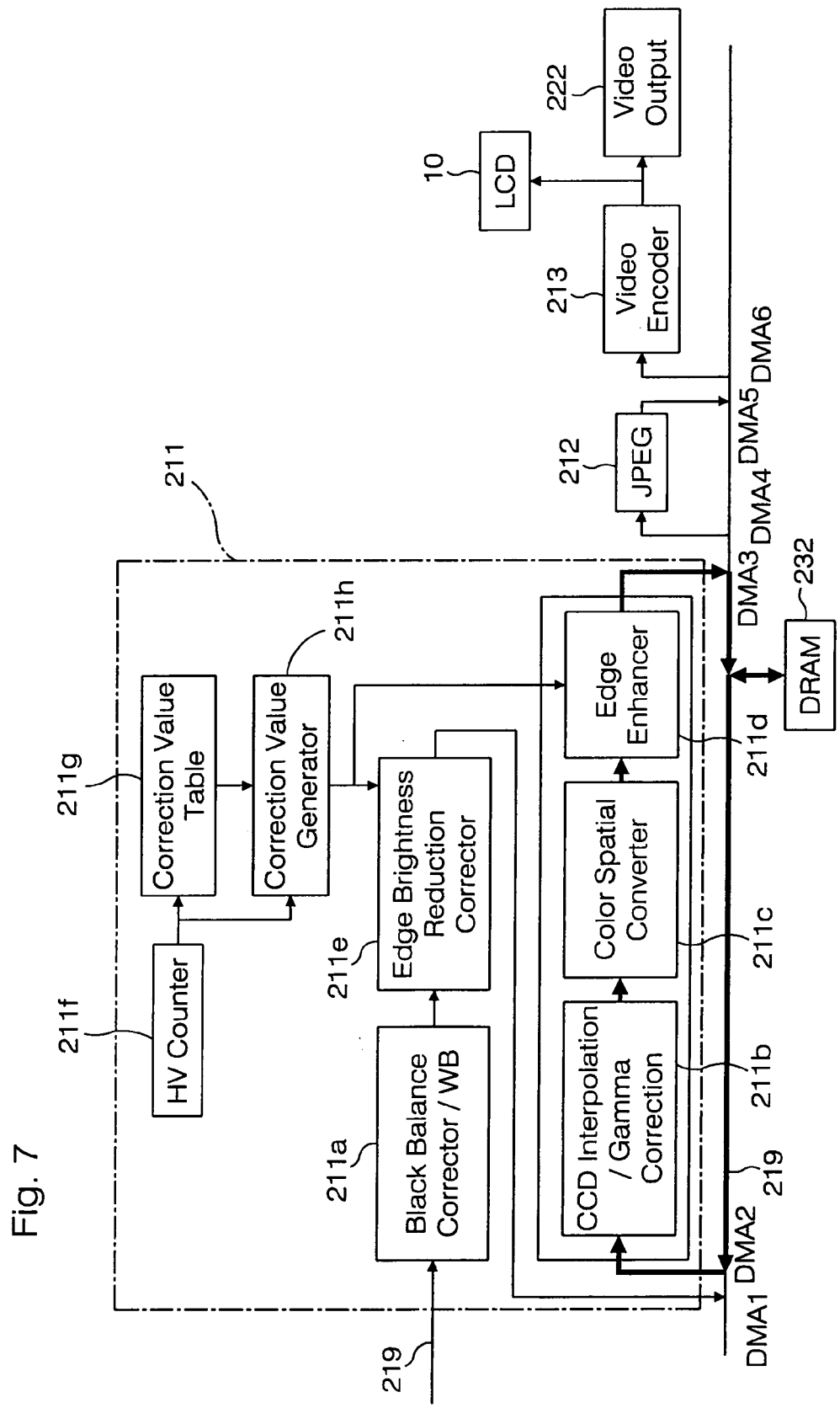
FIG. 7 is a block diagram showing a bus, an image signal processor, etc.
Figure 8:
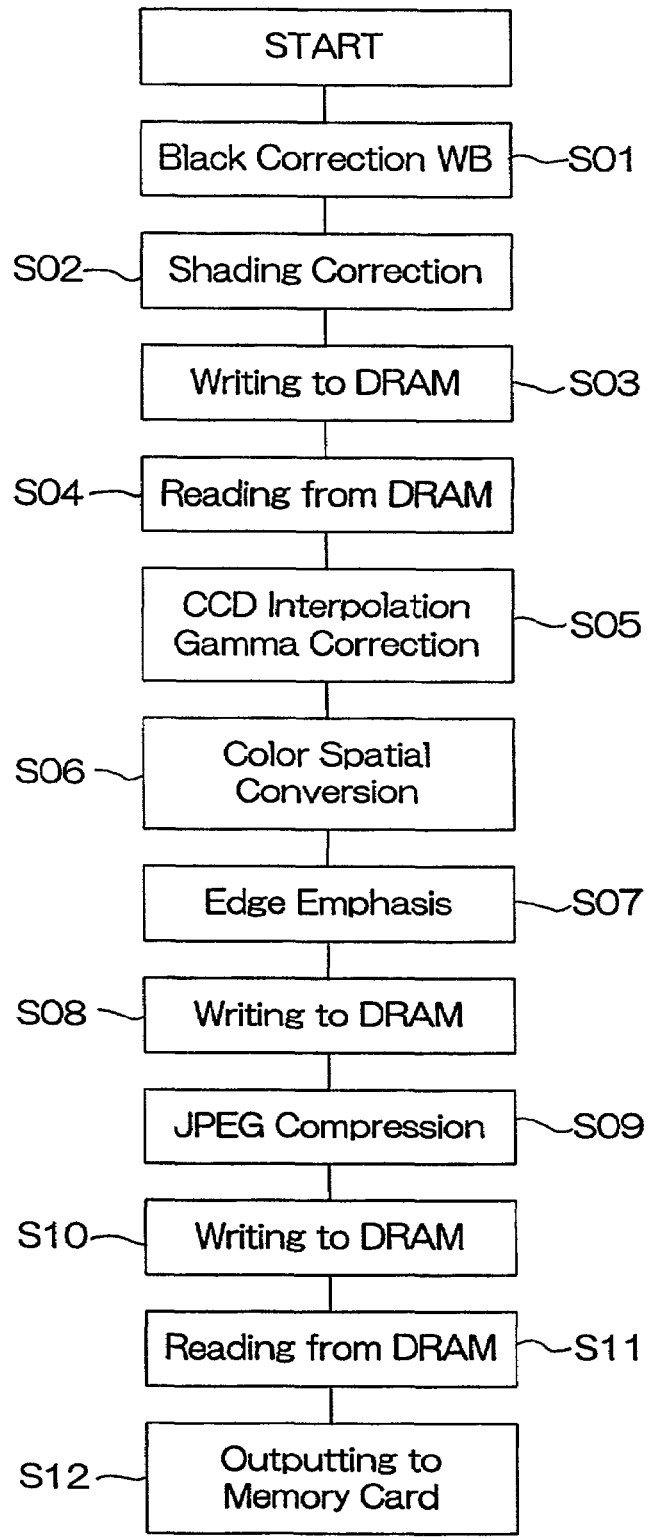
FIG. 8 is a flow chart showing image capturing in the digital camera.

With the image data written in the DRAM 232 frame by frame, as denoted at the thick line in FIG. 7, the data now on the DRAM 232 are thereafter written in the image signal processor 211 through the DMA2 once again (step S04 in FIG. 8). At this stage, the DMA2 scans and reads addresses in such a manner that the data written in the interlace method become as if they are written in the progressive method.

In the image signal processor 211, the processing part 211b for CCD interpolation and gamma correction interpolates the CCD Bayer data into RGB data and gamma-corrects the data (step S05 in FIG. 8), after which the data are converted into YCrCb data by the color spatial converter 211c (step S06 in FIG. 8). Following this, at a step S07 in FIG. 8, the edge enhancer 211d edge-enhances the Y-signal.

At this stage, the edge enhancer 211d reads table data regarding the resolution correction data stored in the correction value table 211g based on a value which is set by the HV counter 211f and generates a correction value, as shown in FIG. 7. The edge enhancer reads the value of the correction value and changes the amount of an added high frequency component, to thereby perform peripheral MTF correction. The edge enhancement will be described in detail later.

The result of the edge enhancement is written in the DRAM 232 through the DMA3 channel (step S08 in FIG. 8).

Following this, with the YCrCb data all written in the DRAM 232, the JPEG compressor/decompressor 212 reads the YCrCb data using the DMA4 and performs image compression in the JPEG method (step S09 in FIG. 8). The JPEG compressor/decompressor 212 writes the compressed image data resulting from the image compression in the DRAM 232 once again through the DMA5 (step S10 in FIG. 8). The compressed image data within the DRAM 232 are thereafter read out (step S11 in FIG. 8), transferred to the memory card controller 214 through the DMA 7 so that a file is created within the memory card 8 (step S12 in FIG. 8).

<Detailed Description of Image Field Edge Brightness Reduction Correction>

Now, detailed operations of actual correction of image field edge brightness reductions will be described.

Figure 9:
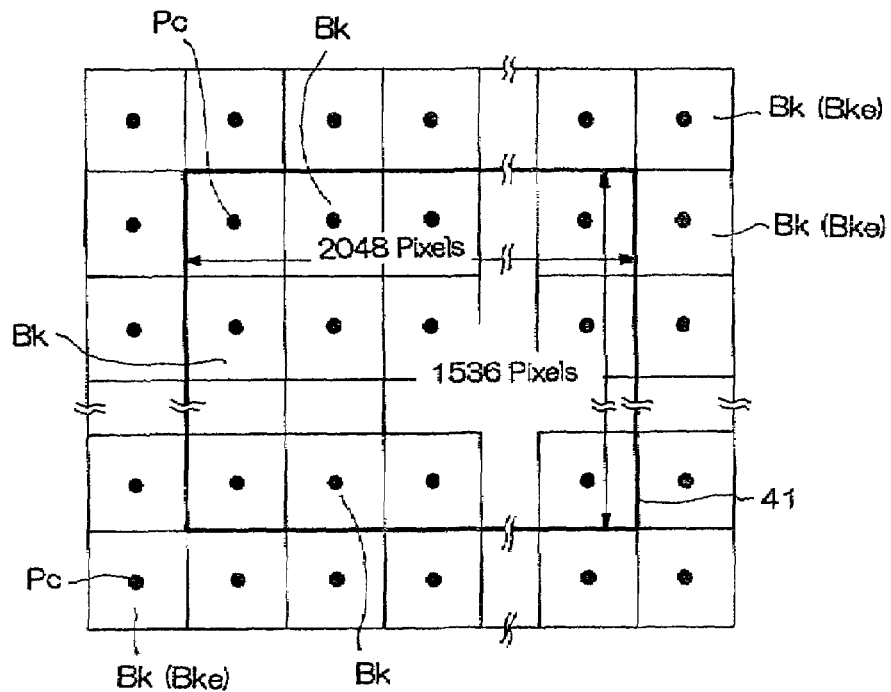
FIG. 9 is a drawing showing a condition that the entire area of an image is divided into a plurality of rectangular blocks.

The correction value table 211g, as shown in FIG. 9, stores in advance a correction value table which is formed by representative light amount correction data, namely, standard light amount correction data, each prepared for each rectangular block Bk which has 64 pixels in the horizontal direction and 48 pixels in the vertical direction in within the entire screen which shows one image 41. For instance, in the case of the image 41 which is expressed by 2048 pixels in the horizontal direction and 1536 pixels in the vertical direction as that shown in FIG. 9, the correction value table includes 34×34=1156 blocks which are expanded by one block Bke around the image 41. The correction value table holds standard light amount correction data whose each piece is taken at a reference position Pc within each block Bk. In the example shown in FIG. 9, the central points of the respective blocks Bk are the reference positions Pc, and predetermined standard light amount correction data which are based on actual measurements are stored in the correction value table.

In this case, the standard light amount correction data includes 34×34=1156 data pieces regarding all blocks Bk.

Figure 10:
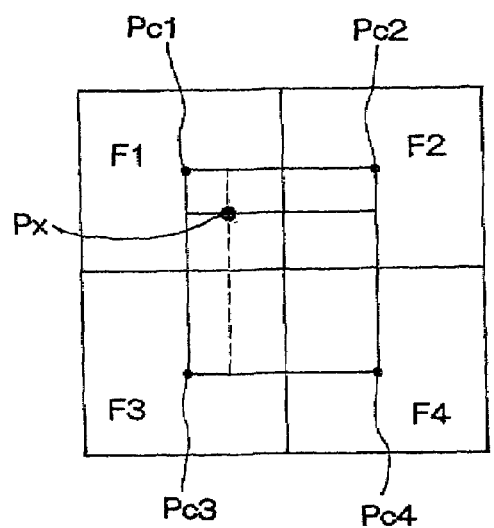
FIG. 10 is a drawing showing a positional relationship between a target pixel and neighboring blocks.

Each block Bk contains 3072 (=64×48) pixels. As shown in FIG. 10, for generation of a correction value for a desired target pixel Px within each block Bk, in the correction value generator 211$h$, the standard light amount correction data regarding four blocks (hereinafter referred to as the "neighboring blocks") F1 through F4, i.e., the block Bk to which the target pixel Px belongs and three neighboring blocks Bk which are close to the target pixel Px in the horizontal, the vertical and the diagonal directions, are weighted by distances, whereby the correction value for the target pixel Px is calculated.

Figure 11:
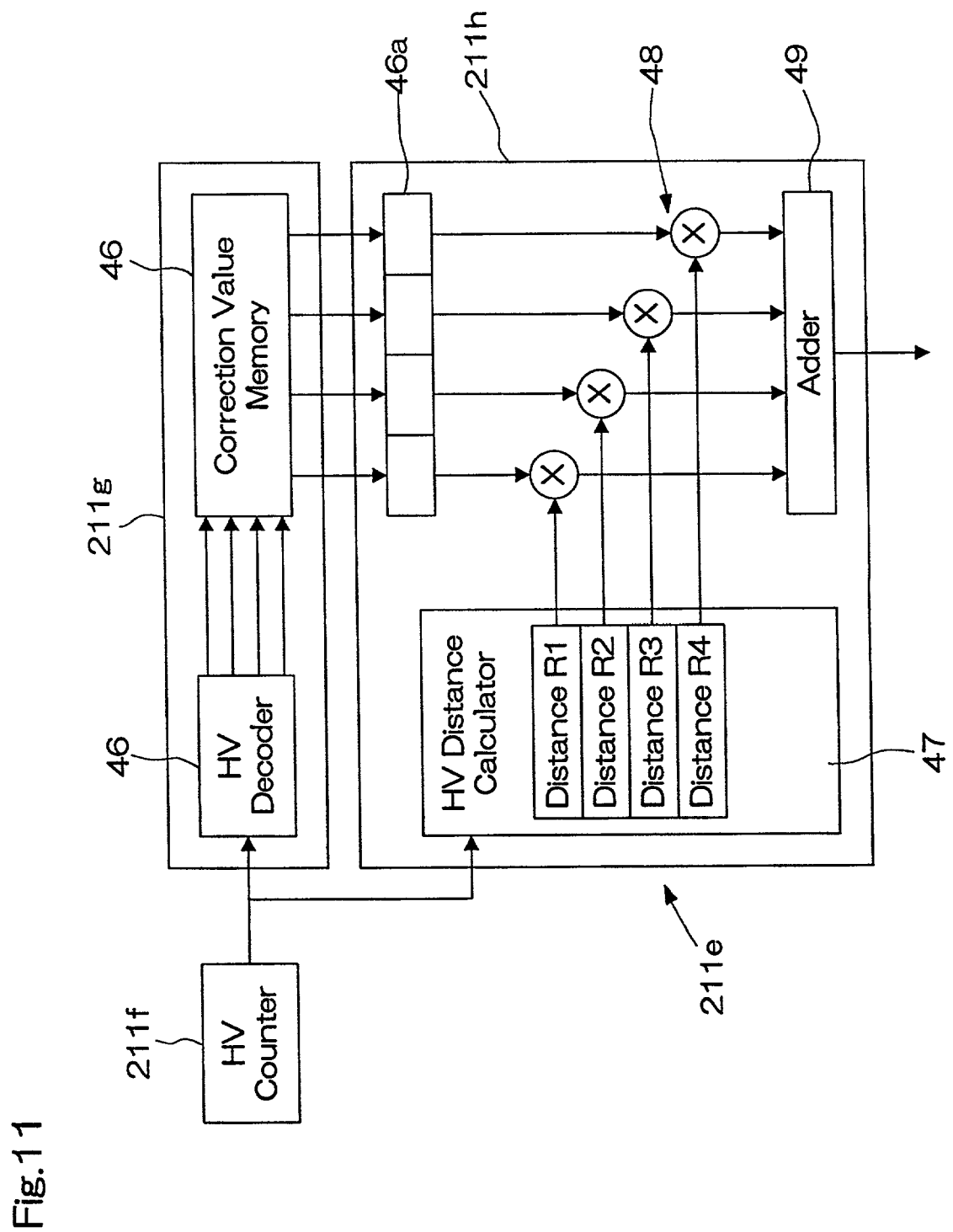
FIG. 11 is a block diagram of an HV counter, a correction value table and a correction value generator.

FIG. 11 shows an example of a structure of the correction value generator 211$h$. In FIG. 11, the HV counter 211$f$ counts the pixels which are supplied sequentially to the image signal processor 211 as denoted at a step S21 in FIG. 12, to thereby detect and output a pixel position at which image field edge brightness reduction correction is being performed. The pixel position information is fed to both the correction value table 211$g$ and the correction value generator 211$h$.

In the correction value table 211$g$, an HV decoder 45 decodes the count result of the HV counter 211$f$, and as shown in FIG. 10, the four neighboring blocks F1 through F4 associated with the target pixel Px are selected (step S22 in FIG. 12), the standard light amount correction data are read from a correction value memory 46 (step S23 in FIG. 12), and the standard light amount correction data are outputted to a register 46$a$ which is within the correction value generator 211$h$. With respect to the frequency of this, the standard light amount correction data regarding the four neighboring blocks F1 through F4 are outputted for every 64 pixels, since the data are read continuously in a horizontal pixel direction during the image processing.

The count result of the HV counter 211$f$ is supplied to the correction value generator 211$h$ as well as described above, as a value of remainder divided by 64 in the horizontal direction and remainder divided by 48 in the vertical direction. In the correction value generator 211$h$, an HV distance calculator 47 calculates distances between the target pixel Px and the reference positions (central points) Pc1 through Pc4 of the four neighboring blocks F1 through F4 as those shown in FIG. 10 based on the count result of the HV counter 211$f$ (step S24 in FIG. 12), and the distances are stored respectively in four distance registers R1 through R4.

Figure 12:
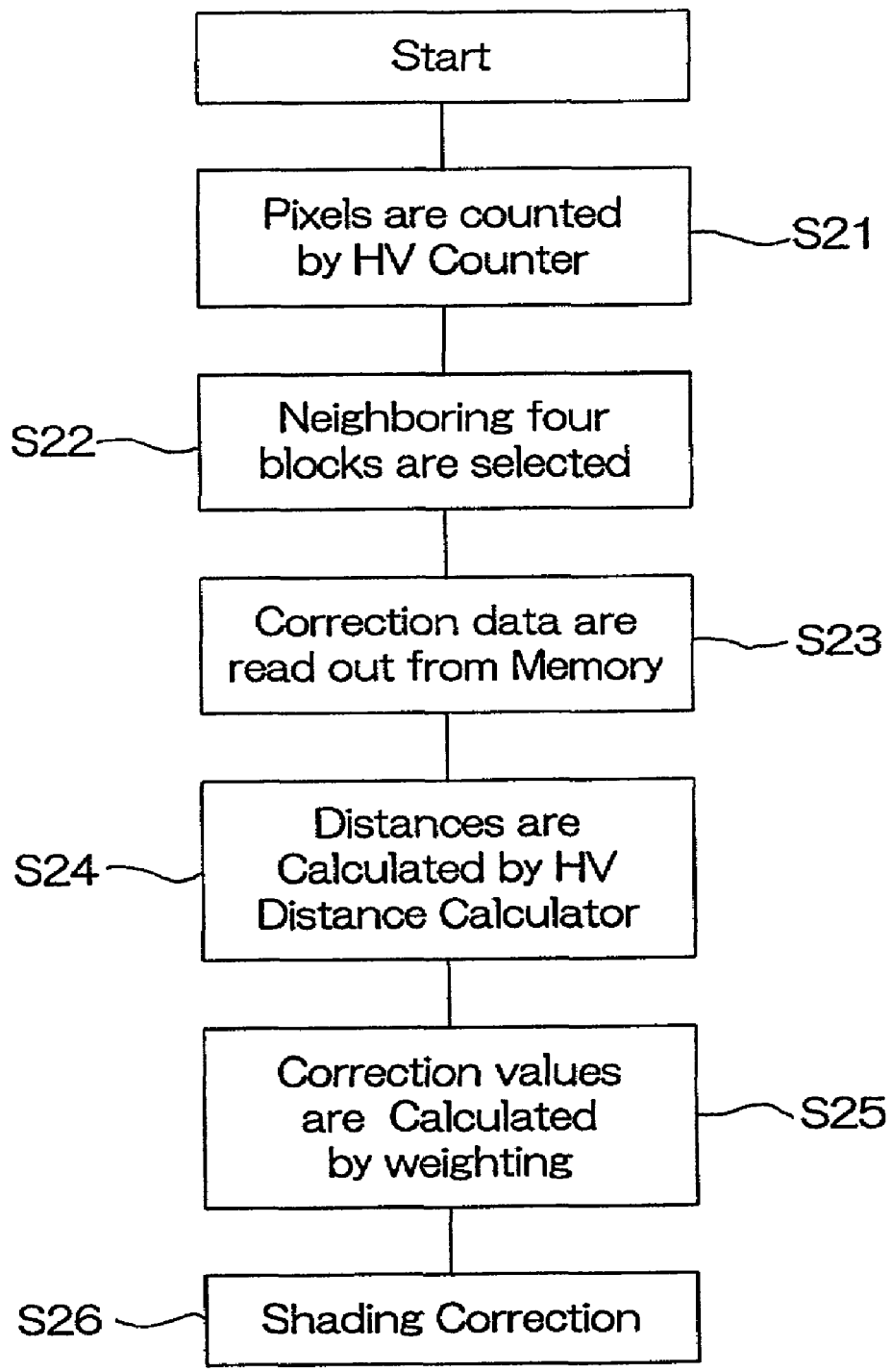
FIG. 12 is a flow chart showing operations of the HV counter, the correction value table and the correction value generator.

Following this, using the values stored in the distance registers R1 through R4, the standard light amount correction data within the register 46$a$ are weighted (step S25 in FIG. 12). That is, multipliers 48 multiply the four pieces of the standard light amount correction data stored within the register 46$a$ with the distance values stored in the distance registers R1 through R4, an adder 49 adds up the four values multiplied by the multipliers 48 and calculates a correction value. Using the correction value, the image field edge brightness reduction corrector 211$e$ executes shading correction (step S26 in FIG. 12).

The standard light amount correction data within the correction value memory 46 are stored in the flash ROM 231, and the values of the data can be changed appropriately in accordance with an optical condition. For example, when a user changes various optical conditions by means of zooming or manipulation of an aperture stop or the like, in accordance with the changed optical conditions, the data table of the standard light amount correction data is read out from the flash ROM 231 and written in the correction value memory 46, whereby image field edge brightness reduction correction is performed in accordance with the changed optical conditions.

<Detailed Description of Peripheral MTF Correction>

Now, peripheral MTF correction will be described in detail.

As described above, as denoted at the thick line in FIG. 6, the image data once stored in the DRAM 232 through the processing part 211$a$ for black balance correction and WB and the image field edge brightness reduction corrector 211$e$ are supplied to the edge enhancer 211$d$ after travelling through the processing part 211$b$ for CCD interpolation and gamma correction and the color spatial converter 211$c$ as denoted the thick line in FIG. 7. The edge enhancer 211$d$ thereafter performs peripheral MTF correction on a Y-signal component of a YCrCb-signal which is outputted from the color spatial converter 211$c$.

Figure 13:
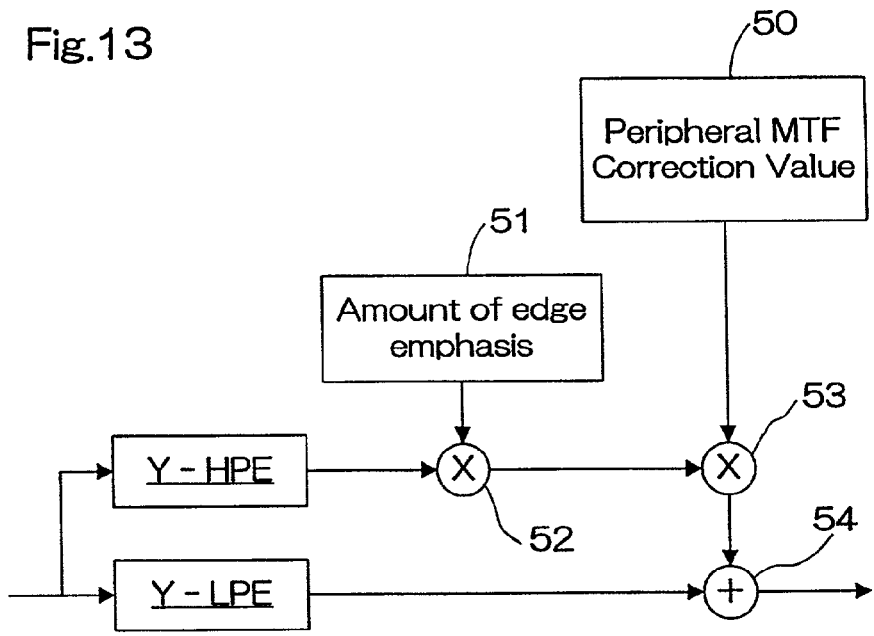
FIG. 13 is a block diagram showing an edge enhancer.

FIG. 13 is a drawing showing a structure of the edge enhancer 211$d$ which performs MTF correction. The edge enhancer 211$d$, as shown in FIG. 13, comprises a high-pass filter Y-HPF and a low-pass filter Y-LPF for band separation of the Y-signal component of the YCrCb-signal which is outputted from the color spatial converter 211$c$, a first multiplier 52 which multiplies a high frequency component extracted by the high-pass filter Y-HPF by an edge emphasis amount 51 which is set by firmware to thereby amplify the amount of the high frequency component, a second multiplier 53 which multiplies the multiplication result of the first multiplier 52 by peripheral MTF correction data (resolution correction data) 50, and an adder 54 which adds the multiplication result of the second multiplier 53 to a low frequency component of the Y-signal component which is outputted from the low-pass filter Y-LPF.

The peripheral MTF correction data 50 are calculated by the correction value table 211$g$ and the correction value generator 211$h$. That is, as in the case of the standard light amount correction data for the image field edge brightness reduction correction, MTF correction values at the central points of the respective blocks Bk (denoted at Pc in FIG. 9 and Pc1 through Pc4 in FIG. 10) are stored in the correction value memory 46 (FIG. 11) in advance as standard MTF correction data, the HV decoder 45 decodes the count result of the HV counter 211$f$, and as shown in FIG. 10, the four neighboring blocks F1 through F4 associated with the target pixel Px are selected, the standard MTF correction data are read out from the correction value memory 46 and outputted to the register 46$a$ which is disposed within the correction value generator 211$h$. With respect to the frequency of this, the standard MTF correction data regarding the four neighboring blocks F1 through F4 are outputted for every 64 pixels, since the data are read continuously in a horizontal pixel direction during the image processing.

The count result of the HV counter 211$f$ is supplied to the correction value generator 211 has well as described above, as a value of remainder divided by 64 in the horizontal direction and remainder divided by 48 in the vertical direction. In the correction value generator 211$h$, the HV distance calculator 47 calculates distances between the target pixel Px and the reference positions Pc1 through Pc4 of the four neighboring blocks F1 through F4 as those shown in FIG. 10 based on the count result of the HV counter 211$f$.

Following this, the multipliers 48 multiply the four pieces of the standard MTF correction data stored within the register 46$a$ with the distance values stored in the distance registers R1 through R4, the adder 49 adds up the four values multiplied by the multipliers 48 and calculates a correction value.

As in the case of the standard light amount correction data, the standard MTF correction data within the correction value memory 46 are stored in the flash ROM 231, and the values of the data can be changed appropriately in accordance with an optical condition. Other similarities to the edge brightness reduction correction include reading of the standard MTF correction data from the flash ROM 231 in accordance with predetermined optical conditions such as a zooming position and the aperture stop manipulated by a user.

As described above, during the shading correction, the image is divided into the plurality of rectangular blocks Bk which have a constant size, representative correction data (standard light amount correction data) which correspond on one-to-one basis to predetermined reference positions within the respective blocks Bk are held, the representative light amount correction data regarding the four neighboring blocks F1 through F4 associated with the target pixel Px are weighted depending on the position of the target pixel Px to calculate a correction value for the target pixel Px, and each target pixel Px is shading-corrected using the correction value. Hence, it is possible to prevent boundaries between the blocks Bk from becoming noticeable, and hence, to better improve the quality of the image, as compared with the conventional approaches which require to perform the shading correction on all pixels within each block Bk using one correction value.

Further, since only one piece of the representative light amount correction data is held for each one of the respective blocks Bk, as compared with the conventional approaches which require to hold correction values for all pixels in advance, it is possible to largely reduce the data volume of light amount correction data which are to be prepared. Hence, for shading correction using different correction values in accordance with predetermined optical conditions such as zooming and a stop, or for realization of a high resolution by means of an increased number of elements of the CCD and hence an increased number of pixels, it is possible to largely suppress the data volume of light amount correction data which are to be prepared, and therefore, to reduce a load during data processing.

Peripheral MTF correction for each one of the blocks Bk is possible which has not been heretofore possible, utilizing weighting of the representative resolution correction data (standard MTF correction data) for each block similar to that in the shading correction, and therefore, as in the case of the shading correction described above, the peripheral MTF correction makes it possible to largely improve the quality of the image without making boundaries between the blocks Bk noticeable. With respect to the correction values as well, as in the case of the shading correction, one piece of the representative resolution correction data may be prepared for each one of the respective blocks Bk, and therefore, it is possible to perform the peripheral MTF correction by means of image signal processing with a small load while suppressing the data volume of the entire resolution correction data.

The same HV counter 211$f$, the correction value table 211$g$ and the correction value generator 211$h$ are time-shared between the shading correction and the peripheral MTF correction simply by setting the blocks Bk to be divided commonly to the image signal processing in the shading correction and the image signal processing in the peripheral MTF correction and by switching the data table within the correction value table 211$g$ with the data table of the standard light amount correction data for the shading correction and the standard MTF correction data for the peripheral MTF correction. Hence, particularly when these elements 211$f$, 211$g$ and 211$h$ are realized with hardware, it is possible to make as effective use as possible of the same hardware resource, which leads to an improved efficiency in terms of the circuitry structure.

Figure 14:
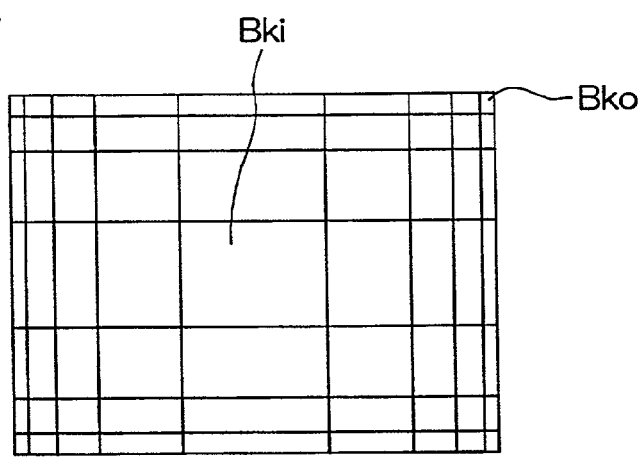
FIG. 14 is a drawing showing a condition that blocks in a peripheral area are set to be smaller than blocks in a central area.

While an image is divided uniformly into the rectangular blocks Bk which have the same shape and are each 64 pixels in the horizontal direction and 48 pixels in the vertical direction and the representative correction data (light amount correction data and resolution correction data) are held for each in the preferred embodiment above, since it is desirable to change the correction data more finely in a peripheral portion than in a central portion considering properties of the lenses, as shown in FIG. 14, the block size of a block Bko in a peripheral area may be set smaller relative to the block size of a block Bki in a central area, so that the shading correction and the peripheral MTF correction are executed more finely in the peripheral area than in the central area.

Figure 15:
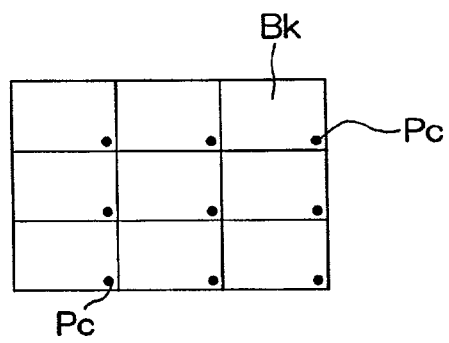
FIG. 15 is a drawing showing a condition that reference positions are set at corner portions of the respective blocks.

Further, while the representative light amount correction data and the representative resolution correction data are provided using the central points of the respective blocks as the reference positions in the preferred embodiment above, the reference positions may not necessarily be the central points as long as the reference positions remain the same among the respective blocks. For instance, the reference positions Pc may be corner points as shown in FIG. 15.

Using the structure above, in a condition that the entire area of an image which is captured by the image pickup element is divided into a plurality of rectangular blocks and the correction value memory holds the light amount correction data each set in advance for each one of the blocks, the correction value generator weights, in accordance with the position of a target pixel, the light amount correction data or resolution correction data regarding a plurality of blocks which are mutually adjacent in the vicinity of the target pixel to thereby generate a correction value for the target pixel, and each pixel is corrected through the image field edge brightness reduction correction based on such correction value, as described in the inventions defined in claims 5 and 6. Hence, as compared with the conventional approaches which require to perform the image field edge brightness reduction correction on all pixels within each block using the same correction value, it is possible to prevent boundaries between the blocks Bk from becoming noticeable, and hence, to better improve the quality of the image.

In addition, since only one piece of the representative light amount correction data is held in advance for each block, it is possible to largely reduce the data volume of light amount correction data which are to be prepared, as compared with the conventional approaches which require to hold correction values for all pixels in advance.

Further, using the structure above, in a condition that the correction value memory holds in advance the resolution correction data each set in advance for each one of the blocks which are obtained by dividing the entire area of an image which is captured by the image pickup element into at least a central area and a peripheral area, the respective pixels are edge-enhanced based on the resolution correction data to thereby execute the image field edge resolution reduction correction. Hence, it is possible to level out resolutions of the image and improve the quality of the image.

Further, since only one piece of the representative resolution correction data is held in advance for each block, it is possible to largely reduce the data volume of resolution correction data which are to be prepared, as compared with the conventional approaches which require to hold correction values for all pixels in advance.

Further, the correction values regarding the resolutions at the respective target pixels within the blocks are generated based on the resolution correction data which are held in the correction value memory, and the edge enhancer edge-enhances the respective pixels based on the correction values and the pixels are consequently treated with the image field edge brightness reduction correction. Hence, as compared with the conventional approaches which require to correct the resolutions at all pixels within each block using the same correction value, it is possible to prevent boundaries between the blocks from becoming noticeable, and hence, to better improve the quality of the image.

Further, when the image data treated with the image field edge brightness reduction correction are stored in the image memory and the image data are further treated with the image field edge resolution reduction correction, the same correction value memory and the same correction value generator are shared between correction of image field edge brightness reductions, and correction of image field edge resolution reductions and correction values for these processes are generated in a time-shared manner. Hence, it is possible to make as effective use as possible of the same hardware resource, which leads to an improved efficiency in terms of the circuitry structure.

Further, the correction value memory holds the light amount correction data or the resolution correction data which become different depending on optical conditions, such as zooming up or down and manipulation of a stop, during imaging, it is possible to execute correction of image field edge brightness reductions and/or correction of image field edge resolution reductions which is appropriate to parameters of the optical conditions. Particularly since only one piece of the representative light amount data or the representative resolution correction data is held in advance for each block, it is possible to largely reduce the data volume of light amount correction data or resolution correction data which are to be prepared, as compared with the conventional approaches which require to hold correction values for all pixels in advance.

Further, since the blocks in the peripheral area are set to be smaller than the blocks in the central area, it is possible to change the correction data more finely in the peripheral area than in the central area, which in turn realizes an effect that an image quality is improved particularly in the peripheral area.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera comprising:
an image pickup element for capturing an image;
a correction value memory for storing predetermined light amount correction data each set in advance for each one of predetermined blocks which are obtained by dividing the entire area of the image captured by the image pickup element into at least a central area and a peripheral area;
a correction value generator for generating correction values regarding light amounts at the respective target pixels within the blocks based on the plurality pieces of light amount correction data which are held in the correction value memory; and
an image field edge brightness reduction corrector for correcting brightness reductions at the respective pixels based on the correction values regarding light amounts generated by the correction value generator.

2. A digital camera according to claim 1,
wherein the correction value generator weights, in accordance with the positions of target pixels, the light amount correction data which are associated with blocks containing the target pixels and other neighboring blocks next to the target pixels of the image which is captured by the image pickup element, to thereby generate the correction values regarding the light amounts at the target pixels.

3. A digital camera according to claim 1,
wherein the correction value memory holds predetermined resolution correction data each set in advance for each one of the blocks, and the correction value generator generates correction values regarding resolutions at the respective target pixels within the blocks based on the resolution correction data which are held in the correction value memory, and
said digital camera further comprising an edge enhancer which enhances edges of the respective pixels based on the correction values regarding the resolutions generated by the correction value generator to thereby correct image field edge resolution reductions.

4. A digital camera according to claim 3,
wherein the correction value generator weights, in accordance with the positions of target pixels, the resolution correction data which are associated with blocks containing the target pixels and other neighboring blocks next to the target pixels of the image which is captured by the image pickup element, to thereby generate the correction values regarding the resolutions at the target pixels.

5. A digital camera according to claim 1,
wherein the correction value memory holds the light amount correction data which become different depending on a predetermined optical condition during imaging.

6. A digital camera according to claim 1,
wherein the blocks in the peripheral area are set to be smaller than the blocks in the central area.

7. A digital camera comprising:
an image pickup element for capturing an image;
a correction value memory for storing predetermined resolution correction data each set in advance for each one of predetermined blocks which are obtained by dividing the entire area of the image captured by the image pickup element into at least a central area and a peripheral area, at least one of the predetermined blocks corresponding to a plurality of pixels; and an edge enhancer for edge-emphasizing the respective pixels based on the resolution correction data which are held in the correction value memory to thereby correct image field edge resolution reductions.

8. A digital camera according to claim 7 further comprising:
a correction value generator which generates correction values regarding resolutions at the respective pixels within the blocks based on the resolution correction data which are held in the correction value memory,
wherein the edge enhancer edge-enhances the respective pixels based on the correction values regarding resolutions generated by the correction value generator to thereby correct image field edge resolution reductions.

9. A digital camera according to claim 8,
wherein the correction value generator weights, in accordance with the positions of target pixels, the resolution correction data which are associated with blocks containing the target pixels and other neighboring blocks next to the target pixels of the image which is captured by the image pickup element, to thereby generate the correction values regarding the resolutions at the target pixels.

10. A digital camera according to claim 7,
wherein the correction value memory holds the resolution correction data which become different depending on a predetermined optical condition during imaging.

11. A digital camera according to claim 7,
wherein the blocks in the peripheral area are set to be smaller than the blocks in the central area.

12. An image signal processing method for a digital camera, comprising:
generating correction values, in a condition that predetermined light amount correction data each set in advance for each one of predetermined blocks which are obtained by dividing the entire area of the image captured by an image pickup element into at least a central area and a peripheral area, regarding light amounts at the respective target pixels within the blocks based on the light amount correction data; and
correcting image field edge brightness reductions at the respective pixels based on the generated correction values regarding the light amounts.

13. An image signal processing method for a digital camera, comprising:
memorizing in advance predetermined resolution correction data each set for each one of predetermined blocks which are obtained by dividing the entire area of the image captured by the image pickup element into at least a central area and a peripheral area, wherein at least one of the blocks corresponds to a plurality of pixels; and
executing edge-enhancement for respective pixels based on the resolution correction data, to thereby correct image field edge resolution reductions.

14. A recording medium which stores a program for correcting light amount drops at the edge of an image field which is captured using a predetermined image pickup element of a digital camera, wherein the program is for executing a sequence in which,
generating correction values, in a condition that predetermined light amount correction data each set in advance for each one of predetermined blocks which are obtained by dividing the entire area of the image captured by the image pickup element into at least a central area and a peripheral area are held in the digital camera, regarding light amounts at the respective target pixels within the blocks based on the light amount correction data; and
correcting image field edge brightness reductions at the respective pixels based on the generated correction values regarding the light amounts.

15. A recording medium which stores a program for correcting resolutions at the edge of an image field which is captured using a predetermined image pickup element of a digital camera, wherein the program is for executing a sequence in which,
executing edge enhancement, in a condition that predetermined resolution correction data each set in advance for each one of a predetermined plurality of multi-pixel blocks which are obtained by dividing the entire area of the image captured by the image pickup element into at least a central area and a peripheral area are held in the digital camera, for the respective pixels based on the held resolution correction data, to thereby correct image field edge resolution reductions.

* * * * *